(12) United States Patent
Zhuk et al.

(10) Patent No.: US 10,694,028 B2
(45) Date of Patent: Jun. 23, 2020

(54) SYSTEMS AND METHODS FOR GENERATING APPLICATION DATA FROM CALL DATA

(71) Applicant: RingCentral, Inc., Belmont, CA (US)

(72) Inventors: Alexey Petrovich Zhuk, Saint-Petersburg (RU); Aleksei Nikolaevich Dziubenko, Saint-Petersburg (RU); Ivan Gennadevich Anisimov, Saint-Petersburg (RU)

(73) Assignee: RINGCENTRAL, INC., Belmont, CA (US)

( * ) Notice: Subject to any disclaimer, the term of this patent is extended or adjusted under 35 U.S.C. 154(b) by 0 days.

(21) Appl. No.: 16/237,584

(22) Filed: Dec. 31, 2018

(65) Prior Publication Data
US 2019/0149656 A1 May 16, 2019

Related U.S. Application Data

(63) Continuation of application No. PCT/RU2017/000465, filed on Jun. 29, 2017.

(51) Int. Cl.
H04M 3/36 (2006.01)
H04M 3/22 (2006.01)
(Continued)

(52) U.S. Cl.
CPC .......... *H04M 3/36* (2013.01); *H04M 3/2254* (2013.01); *H04M 3/493* (2013.01);
(Continued)

(58) Field of Classification Search
CPC ...... H04M 3/36; H04M 3/2254; H04M 3/493; H04M 3/5166
(Continued)

(56) References Cited

U.S. PATENT DOCUMENTS 6,192,118 B1 * 2/2001 Bayless ............... H04M 1/2473
379/201.01
8,654,939 B2 * 2/2014 Kovales ................ H04M 3/533
379/69
(Continued)

OTHER PUBLICATIONS

International Search Report and Written Opinion dated May 17, 2018, corresponding to PCT/RU2017/000465, 7 pages.

*Primary Examiner* — Md S Elahee
(74) *Attorney, Agent, or Firm* — Finnegan, Henderson, Farabow, Garrett & Dunner LLP

(57) ABSTRACT

Systems and methods are provided for generating application data from call data. In one implementation, a method includes acquiring call data from a call-data source with a call-data aggregator; modifying a portion of the call data with a call-data modifier; and generating application data from the portion of the call data. Application data may be configured for diagram generation. The diagram may graphically indicate call volume in branches of an interactive voice response (IVR) system map. The diagram may be a flow diagram including a connector associated with a branch of the IVR system map and the connector may have a width proportional to a call volume in the branch of the IVR system map. The diagram may indicate call-portion durations, which may be associated with a phase of a call and which may have a color associated with a phase of a call.

20 Claims, 8 Drawing Sheets

(51) Int. Cl.
*H04M 3/493* (2006.01)
*H04M 3/51* (2006.01)
*G06F 3/0484* (2013.01)
*G06F 3/0482* (2013.01)
*G06T 11/00* (2006.01)
*G06T 11/20* (2006.01)

(52) U.S. Cl.
CPC ......... *H04M 3/5166* (2013.01); *G06F 3/0482* (2013.01); *G06F 3/0484* (2013.01); *G06T 11/001* (2013.01); *G06T 11/206* (2013.01); *H04M 2203/556* (2013.01)

(58) Field of Classification Search
USPC ..... 379/88.11, 88.18, 212.01, 201.01, 88.23; 370/389; 715/752, 772; 455/466
See application file for complete search history.

(56) References Cited

U.S. PATENT DOCUMENTS

| | | | |
|---|---|---|---|
| 8,938,059 B2* | 1/2015 | Chen | H04M 3/36 379/212.01 |
| 9,253,321 B2 | 2/2016 | Zhuangzi | |
| 2011/0239149 A1* | 9/2011 | Lazo | G06F 3/0482 715/772 |
| 2012/0071179 A1* | 3/2012 | Gonzalez Escribano | H04L 51/063 455/466 |
| 2012/0320912 A1* | 12/2012 | Estrada | H04W 4/90 370/389 |
| 2013/0022181 A1* | 1/2013 | Or-Bach | H04M 3/493 379/88.11 |
| 2014/0115496 A1* | 4/2014 | Zhu | G06F 3/0481 715/752 |
| 2014/0179283 A1 | 6/2014 | Kwon et al. | |
| 2016/0335050 A1 | 11/2016 | Koul et al. | |
| 2018/0359530 A1* | 12/2018 | Marlow | H04N 21/4394 |

* cited by examiner

SYSTEMS AND METHODS FOR GENERATING APPLICATION DATA FROM CALL DATA

This application is a Continuation of International Application No. PCT/RU2017/000465, filed on Jun. 29, 2017, which is incorporated herein by reference in its entirety.

TECHNICAL FIELD

The present disclosure relates generally to the field of interactive voice response (IVR) systems and, more specifically, to systems and methods for generating application data from call data.

BACKGROUND

Service organizations, such as consumer-service organizations, financial institutions, and product retailers, service customers using contact centers. Contact centers may handle a variety of tasks, such as new-business acquisition, customer service, technical support, or customer billing. Contact centers may include IVR services for customers to engage in self-help over the telephone (without or with limited live-agent interaction) or to help route a customer's telephone call to an appropriate agent. For example, an IVR service may route a customer calling with a billing inquiry to an agent in the billing department rather than another department by determining the reason for the customer's telephone call to the contact center.

Organizations running contact centers seek to maximize satisfaction of customers' goals while minimizing the involvement of live agents that require training, compensation, management, equipment, etc. To achieve this, the organizations collect and analyze data pertaining to customers' use of the contact center and how customers' interactions with the contact center are handled (e.g., call data). For example, an organization running a contact center may wish to monitor agent efficiency or track the number of callers to the contact center. This data may be difficult for an organization to monitor and analyze. For instance, some organizations may use an external Voice over Internet Protocol (VoIP) provider for their telephone network and IVR system. In such case, an organization may have limited access to the data it needs to monitor and analyze its contact center's operation. Further, because call data changes and may be spread out across multiple servers, the organization running the contact center may need to invest in a high-bandwidth network and large data-storage capabilities to receive, store, and process the call data. This may also require Information Technology (IT) resources and personnel to manage the network and data storage. Even if an organization received the call data directly from the VoIP provider, such as through an application, the organization may have no effective way to analyze the large amount of data it receives without investing time and resources into developing data-analytics systems and software, and without investing resources into an IT infrastructure. This, again, is due in part to the dynamic nature of the contact center's call data.

Accordingly, methods and systems are needed for generating application data from call data.

SUMMARY

Presently disclosed embodiments are directed to computer-implemented systems and methods for generating application data from call data. In one example embodiment, a computer-implemented method may include acquiring, with one or more call-data aggregators, call data from at least one call-data source; modifying at least a portion of the call data with a call-data modifier; and generating application data from the portion of the call data, the application data being configured for diagram generation. The method may also include generating a diagram from the application data, the diagram graphically indicating the number of callers ("call volume") in branches of an IVR system map. The diagram may be a flow diagram comprising a connector associated with a branch of the IVR system map and the connector may have a width proportional to a call volume in the branch of the IVR system map. The connector may have a color associated with a branch of the IVR system map. The connector may have a color associated with an endpoint of a branch of the IVR system map. The method may also include generating a diagram from the application data, wherein the diagram may graphically indicate a plurality of call-portion durations and wherein each call-portion duration may be associated with a phase of a call. At least one call-portion duration may have a color associated with a phase of a call.

In another example embodiment, a system for generating application data from call data may include one or more call-data aggregators; one or more call-data modifiers; at least one memory device storing computer-executable instructions; and at least one processor configured to execute the stored instructions to (i) acquire, with a call-data aggregator, call data from at least one call-data source; (ii) modify at least a portion of the call data with a call-data modifier, and (iii) generate, with the call-data modifier, application data from the portion of the call data, the application data being configured for diagram generation. The diagram may graphically indicate call volume in branches of an IVR system map. The diagram may be a flow diagram comprising a connector associated with a branch of the IVR system map, the connector having a width proportional to a call volume in the branch of the IVR system map. The connector may have a color associated with a branch of the IVR system map. The connector has a color associated with an endpoint of a branch of the IVR system map. The diagram may graphically indicate a plurality of call-portion durations and each call-portion duration may be associated with a phase of a call. The at least one call-portion duration may have a color associated with a phase of a call.

In a further example embodiment, a non-transitory computer-readable medium stores instructions executable by at least one processor to facilitate generating application data from call data according to a method. In one embodiment, the method may include acquiring, with one or more call-data aggregators, call data from at least one call-data source; modifying at least a portion of the call data with a call-data modifier; and generating application data from the portion of the call data, the application data being configured for diagram generation. The method may also include generating a diagram from the application data, the diagram graphically indicating call volume in branches of an IVR system map. The diagram may be a flow diagram comprising a connector associated with a branch of the IVR system map and the connector may have a width proportional to a call volume in the branch of the IVR system map. The connector may have a color associated with a branch of the IVR system map. The connector may have a color associated with an endpoint of a branch of the IVR system map. The method may also include generating a diagram from the application data, the diagram graphically indicating a plurality of call-portion durations and wherein each call-portion duration may be associated with a phase of a call. At least one call-portion duration may have a color associated with a phase of a call.

The foregoing general description and the following detailed description are explanatory only and are not restrictive of the claims.

BRIEF DESCRIPTION OF THE DRAWINGS

The accompanying drawings, which are incorporated in and constitute a part of this disclosure, illustrate several embodiments and, together with the description, serve to explain the disclosed principles. In the drawings.

DETAILED DESCRIPTION

Figure 1:
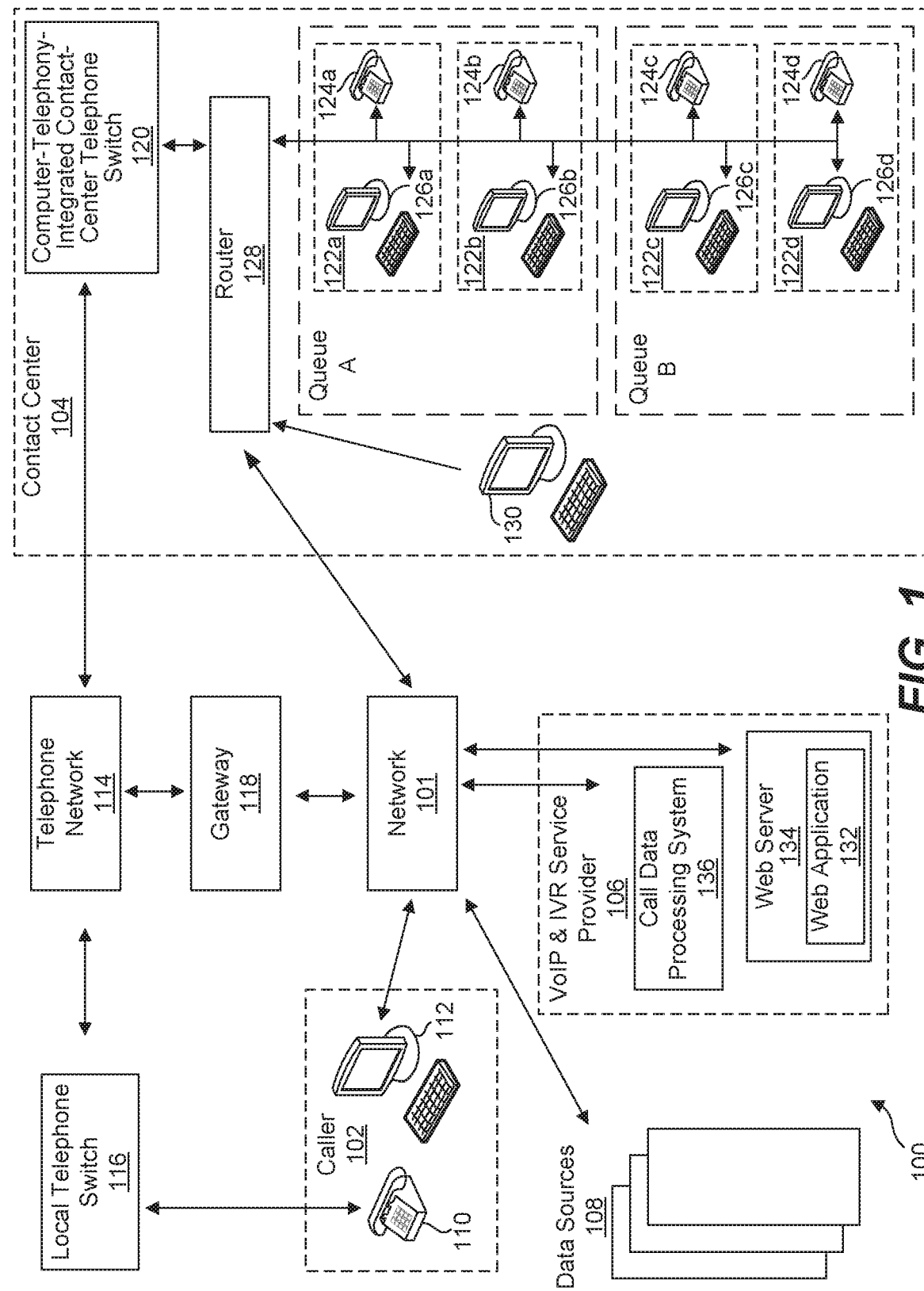
FIG. 1 depicts an example of a system environment in which the disclosed embodiments of systems and methods for generating application data from call data may be implemented.

As described in more detail below, the disclosed embodiments are directed to systems and methods for generating application data from call data to facilitate contact-center monitoring. Application data may be data used by an application or a web application, such as an application hosted on a server and running a user interface in a web browser. The web application may use application data or web application data to perform various functions for which the web application is intended, such as monitoring a contact center. An organization running a contact center may want to monitor various statistics pertaining to the operation of its contact center, such as the number of calls the contact center receives, efficiency of particular contact-center agents, or how many calls to the contact center were resolved to the caller's satisfaction. When, for example, an organization uses a VoIP provider, which may also be an IVR-service provider, for its contact center's phone network, such monitoring may be performed using, for example, a web application hosted by the VoIP provider. Personnel from the organization may access the VoIP provider's web application using a web browser and view the contact-center statistics they are interested in. The web application may generate displays, diagrams, charts, and/or tables for visualizing the statistics for the organization's personnel to view. Such visualizations may be generated from web application data received by the web application.

Web application data may be generated from call data. In some embodiments, web application data may be generated dynamically from call data. Call data may be information that pertains to one or more calls to or from the contact center. In some embodiments, call data may be updated dynamically. Because a VoIP or IVR-service provider may have many customers (e.g., organizations that purchase IVR services for their contact centers) and thus may need to generate diagrams and/or tables for many web application sessions simultaneously, VoIP or IVR service providers may seek systems or methods for generating web application data from call data. The efficiency of these systems may permit the VoIP and/or IVR service provider to properly balance resources (e.g., by allocating fewer network resources for sending web application data to the hosted web application). Additionally, an architecture for such a system for generating web application data may permit the VoIP and/or IVR customers to receive requested data, diagrams, or tables in real time, which is faster than with an architecture for a less efficient system. This may be particularly useful when monitoring contact-center operation because of the dynamic nature of the data (e.g., monitoring in real-time as calls are being routed between different agents, queues, and IVR-network branches—discussed in more detail below—within the contact center).

In one example embodiment of a system for generating web application data from call data, call data may be acquired from a call-data source (sometimes referred to as a "data source") by a call-data aggregator (sometimes referred to as a "data aggregator"). The data aggregator may send the call data to a call-data modifier (sometimes referred to as a "data modifier"). The data modifier may modify the call data to generate web application data. The data modifier may send the web application data to the web application. The data aggregator and data modifier in this example are formed by a combination of hardware and software. The web application may use the web application data to generate a diagram. Such diagram may be used by organization personnel to monitor the operation of its contact center.

The foregoing features provide several advantages over system and methods that do not follow the disclosed methods when generating web application data from call data. For example, systems and methods disclosed herein may be used to efficiently generate great quantities of web application data and provide a large number of customers with contact-center statistics in real time, which is faster and more efficient than existing systems and methods.

Reference will now be made in detail to methods and implementations that seek to address the problems discussed above. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as provided by the appended claims. In addition, specific details may be provided in order to promote a thorough understanding of the described implementations. Some implementations within the scope of this disclosure may be practiced without some or all of these details. Further, well-known features may not have been described in detail for the sake of clarity.

The example embodiments disclosed herein include computer-implemented methods, non-transitory computer-readable mediums, and systems. The computer-implemented methods may be executed, for example, by at least one processor of a server that executes instructions stored in a non-transitory computer-readable storage medium. As used herein, a non-transitory computer-readable storage medium may include various types of memory such as, for example, a flexible disk, hard disk, solid state drive, magnetic tape, or any other magnetic data storage medium, a CD-ROM, any other optical data storage medium, a RAM, a PROM, and EPROM, a FLASH-EPROM or any other flash memory, NVRAM, a cache, a register, any other memory chip or cartridge, and networked versions of the same. Singular terms, such as "memory" and "computer-readable storage medium," can additionally refer to multiple structures, such a plurality of memories or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with the embodiments described herein. Additionally, one or more computer-readable storage mediums may be used to implement a computer-implemented method. The term "computer-readable storage medium" should be understood to include tangible items and exclude carrier waves and transient signals.

FIG. 1 depicts an example of a system environment 100 in which the disclosed embodiments of systems and methods for generating application data from call data may be implemented. System environment 100 includes, for example, a network 101, one or more caller 102, one or more contact center 104, VoIP & IVR service provider 106 ("service provider 106"), and one or more data sources 108. While in the present example embodiment the VoIP & IVR service provider 106 are depicted as a single component, in other implementations, the VoIP and service providers may be separate entities.

Network 101 facilitates communication between various components of system environment 100. Network 101 may be an electronic network. Components of system environment 100 may be configured to receive data over network 101, process/analyze queries and data. Examples of network 101 include a local area network (LAN), a wireless LAN (e.g., a "WiFi" network), a wireless Metropolitan Area Network (MAN) that connects multiple wireless LANs, a wide area network (WAN) (e.g., the Internet), and a dial-up connection (e.g., using a V.90 protocol or a V.92 protocol). In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, the electronic network may also include one or more mobile device networks, such as a GSM network or a PCS network, that allow mobile devices to send and receive data via applicable communication protocols, including those described above. Further, components in system environment 100 may operate and/or interact with one or more host servers and one or more user devices for the purpose of implementing features described herein.

In this example, caller 102 is a person seeking service from contact center 104. While only one caller 102 is illustrated in FIG. 1, one of ordinary skill in the art would appreciate that one or more callers may be part of system environment 100. Caller 102 may attempt to communicate with contact center 104 using one or more telephonic devices, such as a Public Switched Telephone Network (PSTN) telephone, a mobile telephone, or another type of telephone. Such telephonic device may be represented by caller telephone 110 ("caller phone 110"). Caller 102 may attempt to communicate with contact center 104 using a device that may or may not connect directly to a PSTN, such as desktop computer, VoIP telephone, videoconferences devices, or another type of device. Such device may be represented by caller device 112. Caller phone 110 may be connected to a telephone network 114 via a local telephone switch 116. Local telephone switch 116 may be, for example, an automated call distributor or a private branch exchange switch. Telephone network 101 may be a private or public telephone carrier network (e.g., a PSTN). A gateway 118 may connect telephone network 101 with network 101 to provide cross communication between the two networks.

If caller 102 attempts to communicate with contact center 104 over telephone network 101, a connection for signal transfer will be made between caller phone 110 and a computer-telephony-integrated contact-center telephone switch 120 ("contact-center telephone switch 120"). Call-center agents 122a-d ("agents 122a-d") may have agent telephonic devices 124a-d (e.g., VoIP telephones) and agent non-telephonic devices 126a-d (e.g., a desktop computer) connected to a router 128 that facilitates communication between agent telephonic devices 124a-d, agent non-telephonic devices 126a-d, caller phone 110, and caller device 112. Router 128 may be, for example, a Power of Ethernet switch. In certain embodiments, agents 122a-d may be assisting callers that were routed different call queues. For example, agents 122a and 122b may be answering callers routed to Queue A, whereas agents 122c and 122d may be answering callers routed to Queue B. Queue A may be, for example, a queue for callers looking to get assistance with billing inquiries and Queue B may be, for example, a queue for callers looking to get assistance with technical-support inquiries.

In addition to the devices described above, a supervisor station 130 may be connected to network 101 via router 128. Supervisor station 130 may be a device (e.g., desktop computer) from which a web application 132 may be accessed over network 101 using a web browser (not shown). Web application 132 may be hosted on one or more web server 134 managed by service provider 106.

A call-data processing system 136, in one implementation, generates web application data from call data that it may acquire from data sources over network 101. Web application 132 may receive web application data from processing system 136. Web application 132 may use the web application data to generate statistic displays and other information pertaining to the operation of contact center 104. For example, web application 132 may generate one or more figures, diagrams, tables, or charts to assist an operator of supervisor station 130 in monitoring the operation of contact center 104 and managing contact center 104. These displays may be rendered by a web browser on supervisor station 130.

Figure 2:
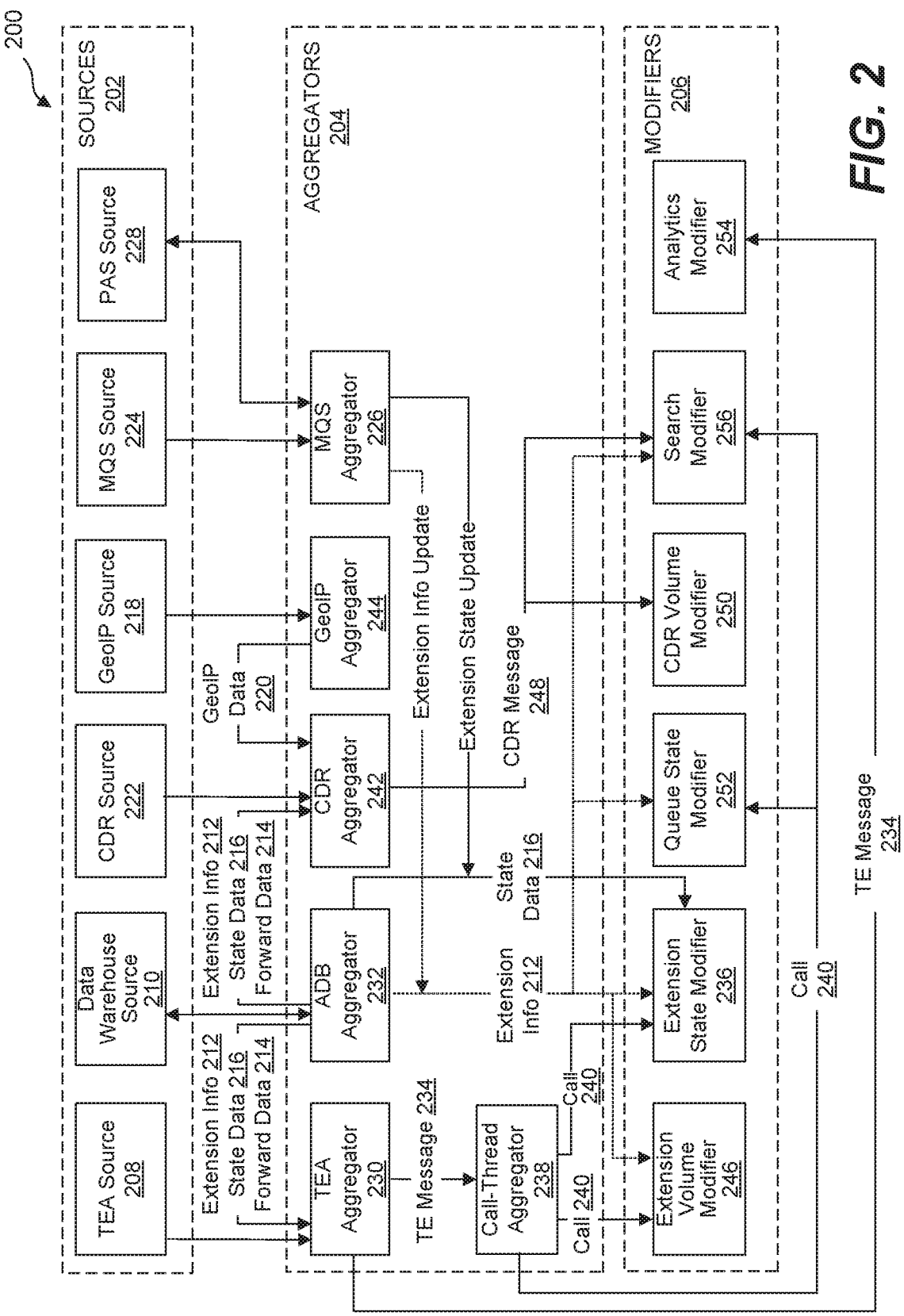
FIG. 2 is a data-flow diagram illustrating an example method of generating application data from call data.

FIG. 2 is a data-flow diagram illustrating an example method 200 of generating web application data from call data. In certain embodiments, the web application data may be used by web application 132 to generate statistics, diagrams, charts, tables, or other visualizations for an operator of supervisor station 130 to view. These visualizations may reflect historical information, current information that is updated in real time, or both. Method 200 may be carried out by processing system 136, another one or more components in system environment 100, or both. In an embodiment, components of the data-flow diagram of FIG. 2 may be grouped into three categories: data sources 202, data aggregators 204, and data modifiers 206.

In one example, data sources 202 are servers that are managed by third parties that store call data. Data sources 202 may provide data to one or more data aggregators 204, discussed in more detail below, in an unsolicited manner, such as whenever an update to the data has occurred. Some data sources 202 may provide data to data aggregators 204 in response to a request from one or more data aggregators 204. In some embodiments, one or more data sources 202 may be managed by service provider 106 while other data sources 202 may be managed by third parties. Different data sources may store different types of call data. As shown in FIG. 2, data sources 202 may include at least one of a Telephonic Exchange Adapter source 208, a data warehouse 210, a GeoIP source 218, a Call Detail Record source 222, a Message Queue Server 224, or a Platform Application Server 228.

The Telephonic Exchange Adapter source 208 ("TEA source 208") in FIG. 2 may be a telephonic server that creates telephonic connections between different points in a telephone network and stores data for each telephonic event to and within contact center 104. This data may include a log of each telephonic event it detects. Examples of such an event include caller 102 calling the telephonic server, the telephonic server connecting caller 102 to another party (e.g., agent 122a in contact center 104), call transfers, and the end of the telephone call. The telephonic server may be implemented as a finite state machine.

The data warehouse 210 in FIG. 2 may store a database, such as an Oracle Database, containing information about the service provider's customers (e.g., contact center 104). One such piece of information may be represented by extension information 212. Extension information 212 may be associated with a customer of service provider 106 (e.g., a manager of contact center 104). Such information may include the names of agents 122a-d, agents' 122a-d telephone number, agents' 122a-d identification numbers, agents' 122a-d workhours, agents' 122a-d time zones, agents' 122a-d addresses, the name of the contact-center operator, the contact-center manager's billing information, service provider's server configurations, etc. Data warehouse 210 may provide information about call-forwarding rules 214 ("forward data 214") for particular extensions (e.g., a rule indicating that calls to contact center 104 get forwarded to voicemail during nighttime hours). Data warehouse 210 may provide extension-state data 216 ("state data 216"), such as whether agent 122a at a particular extension is not ready to take a new call, has a "do not disturb" state, is not available to receive calls from a specific queue but may receive calls from another queue, etc. In certain embodiments, data warehouse 210 may provide the aforementioned information in response to a request, such as a request implemented with the Java Database Connectivity API.

The GeoIP source 218 in FIG. 2 provides processing system 136 with the geographic location associated with an IP address from which a telephone call is made or to which a telephone call is made such as in the case of VoIP communication. This data may be represented as GeoIP data 220.

The Call Detail Record source 222 ("CDR source 222") in FIG. 2 provides call metadata about each telephonic event such as the event's time, duration, completion status, source number, and destination number. CDR source 222 may provide call metadata through a sequence of records such as an Apache Kafka commit log.

The Message Queue Server 224 ("MQS 224") in FIG. 2 notifies a Message Queue Server aggregator 226 ("MQS aggregator 226"), discussed in more detail below, when extension information 212 needs to be updated and when state data 216 needs to be updated. This notification may occur over, for example, the Advanced Message Queuing Protocol.

The Platform Application Server 228 ("PAS 228") in FIG. 2 sends details about updates to extension information 212 and state data 216 to MQS aggregator 226 in response to a request—discussed in more detail below—for the update details. Such request may be sent by MQS aggregator 226. For example, MQS 224 may notify MQS aggregator 226 that the time zone for a particular customer has changed (e.g., during a daylight savings time transition). MQS aggregator 226 may then make a request to PAS 228 for the current time zone for the customer. PAS 228 may respond with the current time zone for the customer.

Data aggregators 204 in FIG. 2 may be software-implemented components operated by service provider 106 to collect call data from data sources 202 and distribute the call data to appropriate data modifiers 206. As shown in FIG. 2, data aggregators 204 may include at least one of a TEA aggregator 230, an Account Database aggregator 232, a call-thread aggregator 238, a Call Detail Record aggregator 242, a GeoIP aggregator 244, or the MQS aggregator 226.

TEA aggregator 230 in FIG. 2, for example, collects call data from TEA source 208 using a messaging protocol such as ZeroMQ. For example, TEA aggregator 230 may subscribe to TEA source's 208 publication of telephonic-event data. TEA aggregator 230 may also receive call data from another aggregator, such as Account Database aggregator 232 ("ADB aggregator 232"), described below in more detail, which in turn received its data from a data source. For example, TEA aggregator 230 may receive call data, such as extension information 212 for a particular call, state data 216, and forward data 214 from ADB aggregator 232. Extension information 212 may comprise data indicating which agent from contact center 104 received a particular call, the agents name, the agents locations, etc. TEA aggregator 230 may be implemented as a finite state machine. TEA aggregator 230 may generate a Telephonic Event Message 234 ("TE message 234") from the aforementioned data it receives. TE message 234 may be a file, such as a Protocol Buffers file, that gets pushed to a sequence of records, such as an Apache Kafka commit log, for modification by data modifiers 206. TE message 234 may contain data from multiple calls because TE message 234 may be a collection of telephonic events and other information for multiple calls. And TE message 234 may be in a machine-readable format.

As discussed above, ADB aggregator 232 in FIG. 2 receives extension information 212, state data 216, and forward data 214 from data warehouse source 210. ADB aggregator 232 may send this information and data to TEA aggregator 230, CDR aggregator 242, and an extension-state modifier 236, discussed in more detail below.

Call-thread aggregator 238 in FIG. 2 obtains TE message 234 from TEA aggregator 230 and generates a call-event record 240 (represented as "call 240" in FIG. 2) for a call using the data in TE message 234. Call-thread aggregator 238 may be implemented as a finite state machine. Call-event record 240 may be a real-time reconstruction of the call from machine-readable data about the call (e.g., TE message 234) into a format easily understood by humans. Call-event record 240 may include data about each call event, such as each event's duration.

Call Detail Record aggregator 242 ("CDR aggregator 242") in FIG. 2 receives GeoIP data 220 from a GeoIP aggregator 244 (discussed in more detail below) and call metadata from CDR source 222. Instead or in addition to GeoIP data 220 and call metadata, CDR aggregator 242 may receive extension information 212, state data 216, and forward data 214 from ADB aggregator 232.

GeoIP aggregator 244 in FIG. 2 may receive GeoIP data 220 from GeoIP source 218, either on demand or as a periodic batch delivery of GeoIP data 220 (e.g., every week). GeoIP data 220 may be forwarded to CDR aggregator 242.

As discussed above, MQS aggregator 226 in FIG. 2 receives a notification from MQS when extension information 212 or state data 216 needs to be updated. This notification may occur over, for example, the Advanced Message Queuing Protocol. MQS aggregator 226, after receiving the notification, may send a request to a PAS 228 to send it details about the change. The request may be a GET request within an application incorporating the Representational State Transfer architecture. PAS 228 may respond with the details about the change. For example, MQS 224 may notify MQS aggregator 226 that the time zone for a particular customer has changed (e.g., during a daylight-savings-time transition). MQS aggregator 226 may then make a GET request to PAS 228 for the current time zone for the customer. PAS 228 may respond with the current time zone for the customer.

Data modifiers 206 in FIG. 2 may be software-implemented components operated by service provider 106 to modify call data to generate web application data and provide the web application data to web application 132. Data modifiers 206 modify a portion of the call data. This modification may comprise generating web application data from the portion of the call data. Doing so allows processing system 136 to send information to web application 132 and to send it when it is needed rather than providing web application 132 with all data pertaining to a particular call before it is needed. For example, processing system 136, using data modifiers 206, may avoid sending information about which server processed data for a particular call to web application 132 by generating web application data without this information. Such system architecture may result in efficient use of network and computational resources. Further, data modifiers 206 may store subscription information, indicating which open sessions of web application 132 should be updated by a given data modifier when there is a change in the call data relevant to the operator of supervisor station 130. For example, when a specific operator of supervisor station 130 initiates a web application session with an Internet browser using a username and password, a diagram showing statistics previously selected by the operator may be displayed. These statistics may be provided to web application 132 by a data modifier 206 and resent when they need to be updated and/or when the operator previously selected them for display. Thus, managing subscriptions in data modifiers 206 and sending web application data when a change occurs may promote efficient use of network and computational resources.

As shown in FIG. 2, data modifiers 206 include at least one of an extension-volume modifier 246, extension-state modifier 236, a search modifier 256, CDR-volume modifier 250, queue-state modifier 252, or an analytics modifier 254.

Extension-volume modifier 246 in FIG. 2 receives call-event record 240 and extension information 212, and use this received data to respond to queries from supervisor station 130, such as a query requesting the successful-call-completion rate for agent 122a during agent's 122a workhours. The call-event record 240 may be used to determine which calls were completed successfully and extension information 212 may be used to determine what the workhours for a particular agent are. Another data modifier 206 may store geographic data pertaining to a call and respond to queries requiring filtering by geography instead of or in addition to extension-volume modifier 246.

Extension-state modifier 236 in FIG. 2 receives call-event record 240 and extension information 212 to generate web application data pertaining to the state of a particular agent 122a-d, such as at what times the agent was on a lunchbreak, at what times the agent had a "do-not-disturb" status, whether the agent has a software application for responding to calls enabled or disabled, how long the agent was in the current state, etc.

Similarly, search modifier 256 in FIG. 2 receives a CDR message 248 as well as call-event record 240 and extension information 212. CDR message 248 may be generated by CDR aggregator 242 and may comprise call metadata and GeoIP data 220. Search modifier 256 may associate CDR message 248 with a corresponding call-event record 240 and supply web application 132 with web application data needed to generate a display of a search result when an operator of supervisor station 130 searches for information about calls filtered based on, for example, geographic origin or destination of a call, names of callers or recipients, phone numbers, extension IDs, durations of calls, etc. As with other data modifiers, search modifier 256 may deliver search results to web application 132 that contain information service provider 106 wants to expose to the operator of supervisor station 130. For example, in some embodiments, search modifier 256 may or may not deliver Quality of Service data to web application 132, despite such data being present in CDR message 248.

CDR-volume modifier 250 ("CDR modifier 250") in FIG. 2 also receives CDR message 248 but allow certain parties to access all information available in CDR message 248. These parties may comprise, for example, federal communication regulators and service provider's 106 technical-support staff. By having different data modifiers 206 dedicated to exposing particular types of information to particular parties, network-bandwidth and computational-resource use may be optimized. For example, data modifiers 206 may modify the data (e.g., pre-process the data) into a format uniquely required by a particular type of user (e.g., an operator of supervisor station 130 or a federal communication commission). In some embodiments, different data modifiers 206 may create web application data that has different information (e.g., search modifier 256 may prepare a list of call-event records 240 that is indexed by the geographic origins of calls without Quality of Service data whereas CDR volume modifier 250 may prepare a table to show Quality of Service data for a telephone call). In certain embodiments, search modifier 256 may keep a repository of historical call-data with which to generate web application data when a historical-search query is made by an operator of supervisor station 130, whereas extension-volume modifier 246 may keep information for a shorter period of time and provide web application data when the operator wants real-time statistics.

Queue-state modifier 252 in FIG. 2 receives call-event record 240 and extension information 212 to calculate statistics pertaining to contact center's 104 queues, such as queue A or queue B. These statistics may include how many callers are in each queue, the average amount of time callers needed to wait in each queue, how many callers are in each IVR-network branch (discussed in more detail below), or how many callers chose particular options in the IVR network (discussed in more detail below).

Analytics modifier 254 in FIG. 2 may be implemented in certain embodiments to receive TE messages 234 over a period of time and provide analytics capabilities for service provider 106.

In certain embodiments, supervisor station 130 will run a web browser that establishes a connection with a software-implemented router (not shown) over a web-circuit protocol such as WebSocket. The software-implemented router may be a component of web application 132 and may have a connection with data modifiers 206. Web application 132 may request, using the software-implemented router, web application data from data modifiers 206 using, for example, the gRPC protocol. In addition or instead, data modifiers 206 may provide web application data to web application 132 in an unsolicited manner when there are changes to the web application data. For example, if real-time data is desired, data modifiers 206 may send updated web application data to web application 132 in an unsolicited manner. If historical data is desired, data modifiers 206 may provide web application 132 with web application data in response to a request for the web application data. Web application 132 may use the received web application data to generate a diagram or other visualization which may then be rendered by the web browser of supervisor station 130. When web application 132 receives a request to generate a diagram showing the number of callers within a queue and the number of callers in various branches of an IVR network, queue-state modifier 252 may generate web application data for generating the diagram using extension information 212 and call-event records 240. If a diagram that visualizes these statistics over a certain period of time is requested, search modifier 256 may generate web application data using CDR message 248, extension information 212, and call-event record 240. Web application 132 may use the web application data generated by search modifier 256 instead of or in addition to the web application data generated by extension-volume modifier 246.

If an operator of supervisor station 130 wants to get information about a particular call, such as a call displayed in the aforementioned queue diagram or the aforementioned IVR-network diagram, web application 132 may receive web application data from extension-volume modifier 246 from which to create a diagram. Such diagram may show the duration of various phases of the phone call, such as how long caller 102 was on hold, how long they were talking to an agent 122a-d, how long the entire call took, etc. Extension-volume modifier 246 may use call-event record 240 to generate web application data that indicates the duration of various phases of the phone call. Web application 132 may receive web application data from queue-state modifier 252 instead of or in addition to web application data from extension-volume modifier 246 when creating the diagram. Queue-state modifier 252 may use extension information 212 to generate web application data that indicates, for example, why a particular agent 122a-d did not receive a call (e.g., because they were in "do-not-disturb" mode) and/or how many other calls were in a particular queue with the call of interest. Web application 132 may receive web application data from search modifier 256 when creating the diagram.

Figure 3:
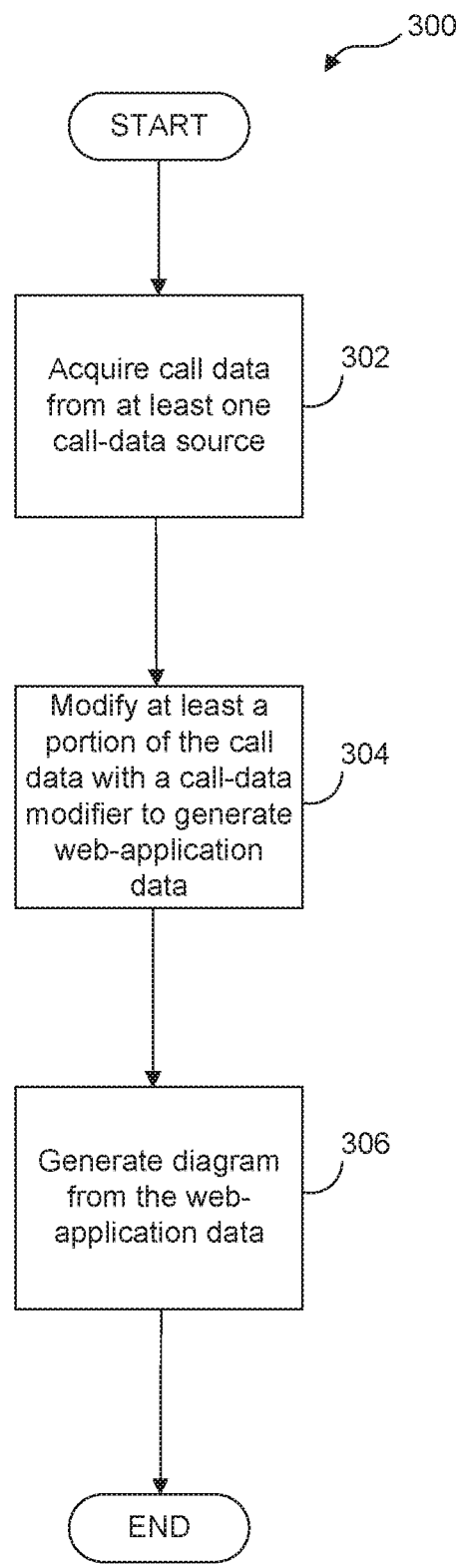
FIG. 3 is a flow chart illustrating an example method for generating application data from call data and using the application data to generate a diagram or table.

FIG. 3 is a flow chart illustrating an example method 300 for generating web application data from call data and using the web application data to generate a diagram or table. Method 300 comprises step 302, whereby a system consistent with the present disclosure acquires call data from at least one data sources 202. In some embodiments, this acquisition may be performed by a data aggregator 204. At step 304, a data modifier 206 may modify at least a portion of the acquired call data to generate web application data configured for diagram and/or table generation. At step 306, a system consistent with the present disclosure generates a diagram and/or a table from the web application data. In some embodiments, at step 306, a data modifier 206 may use the web application data to generate a table. In other embodiments, the web application data may be provided to web application 132 and web application 132 may generate the diagram or table. The diagram or table may be viewed by an operator of supervisor station 130 to manage contact center 104, as discussed above with respect to FIG. 1. The diagram may be, for example, a Sankey diagram, discussed below in more detail. In some embodiments, a table, discussed below in more detail, may be generated instead of or in addition to a diagram.

Figure 4:
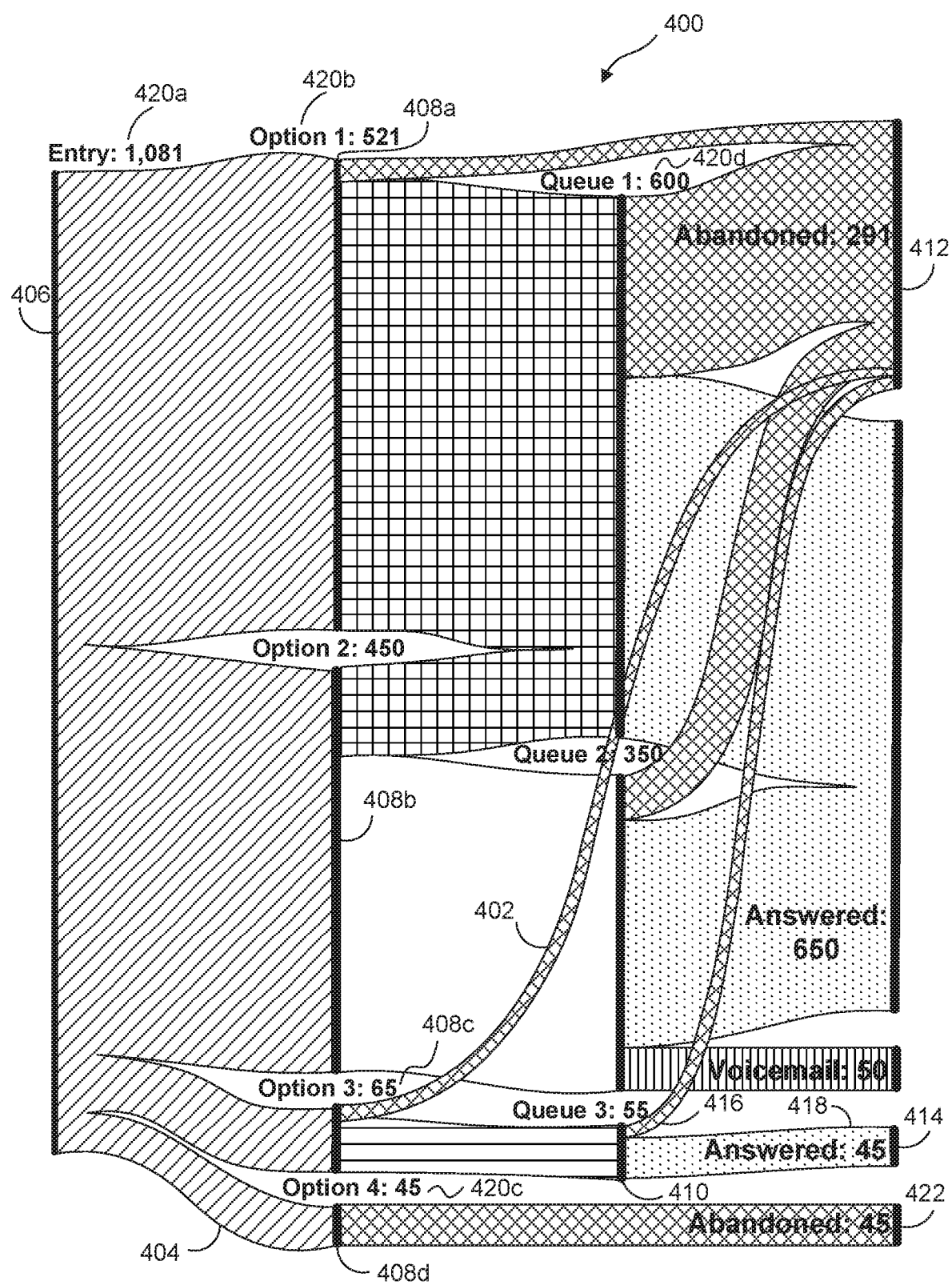
FIG. 4 is an example call-flow diagram that may be generated by an application.

FIG. 4 is an example call-flow diagram 400 that may be generated by web application 132. Call-flow diagram 400 may comprise connectors, such as connectors 402 and 404, associated with branches of an IVR-system network. Connectors may indicate the relative number of callers that proceed through branches of the IVR system as well as the origin or destination of the calls that proceeded through branches of the IVR system. The connectors may have widths proportional to the call volume in the branches of the IVR system. The connectors may have colors that indicate the origin or destination of calls through the IVR system. Call-flow diagram 400 may be, for example, a Sankey diagram.

An IVR system may offer caller 102 one or more options to select over a telephone. For example, the IVR system may prompt callers such as caller 102 to select Option 1 if they have a billing question, Option 2 if they have a technical support question, Option 3 if they want to modify their account information, or Option 4 if they want to speak with a representative without selecting one of the preceding options. After callers select an option, they may be presented with more options. If all options callers may select are mapped out, the resulting tree structure may represent a map of an IVR branch network, with each branch of the network representing a path callers may take through the IVR options.

Call-flow diagram 400 of FIG. 4 may indicate the number of callers that move through the various IVR branches with connectors, each connector having a width proportional to the number callers in the associated IVR branch. Call-flow diagram 400 may indicate how many callers were placed in one or more answering queues. Call-flow diagram 400 may indicate the results of the calls that go through one or more IVR branches, such as whether the calls were answered, abandoned, or transferred to voicemail. Bolded vertical lines in call-flow diagram 400 may represent junctions in the IVR network. For example, line 406 indicates that 1,081 callers called contact center 104. Lines 408a-d indicate that Options 1 through 4 were selected by 521, 450, 65, and 45 callers, respectively. The length of these lines and/or the width of the portions of the diagram connecting the lines (i.e., connectors) may be proportional to the call volume in an associated IVR branch. For example, because 65 callers selected Option 3 whereas 521 callers selected Option 1, line 408c may be shorter than line 408a.

Additionally, the connector leading from line 406 to line 408c may be narrower than the connector leading from line 406 to line 408. Call-flow diagram 400 also indicates, for example, that of the 65 callers who selected Option 3, 55 were placed in Queue 3 and 10 abandoned the call before being placed into Queue 3. Further, call-flow diagram 400 indicates that of the 55 callers placed into Queue 3, 45 had their calls answered and 10 abandoned their calls. As before, because the number of callers who abandoned their calls from Queue 3 is smaller than the number who had their calls answered, connector 416 between line 410 and line 412 is narrower than connector 418 between line 410 and line 414. Instead or in addition, these statistics may be indicated by labels near each line, such as labels 420a-d. In certain embodiments, the bolded vertical lines may be different colors to add clarity to call-flow diagram 400. In some embodiments, solid colors may be used instead of or in addition to the various shading patterns presented in FIG. 4. For example, the same color may be used for the "abandoned" connectors leading to line 412 and the "abandoned" connector leading to line 422 at the top and bottom of call-flow diagram 400, respectively. In an embodiment, the same color may be used for all connectors that emanate from a common connector. In some embodiments, an operator of supervisor station 130 may select whether they want call-flow diagram 400 to display real-time information for their IVR system (i.e., statistics of calls in the system at the time call-flow diagram 400 is being viewed) or historic information (i.e., statistics of calls in the system over some prior window of time).

Figure 5:
FIG. 5 is an example table that may be generated by an application from application data it receives.

FIG. 5 is an example table 500 that may be generated by web application 132 from web application data it receives. Table 500 indicates a date and time a user (or caller) placed or received a phone call (501), a user name for the user (502), a telephone number that the user called or at which the user received the call (503), a direction of the call (i.e., whether the user placed the call or whether the user received the call) (504), a current status of the call (505), a duration of the call (506), which queue the caller was placed into, if any (507), and a diagram providing information about the duration of call-portions associated with different phases of a call (508), discussed below in more detail. In some embodiments, an operator of supervisor station 130 may select whether he/she wants table 500 to display real-time information for contact center 104 (i.e., statistics of calls to or from contact center 104 at the time table 500 is being viewed) or historic information (i.e., statistics of calls to or from contact center 104 over some prior window of time).

Figure 6:
FIG. 6 illustrates an example detail table.

User of web application 132 may select a call or row from table 500 and be presented with another example detail table 600 as illustrated in FIG. 6. Detail table 600 may show details pertaining to various phases the selected call went through (e.g., waiting in a queue or speaking with an agent). For example, detail table 600 may show what time a phase began (601), a name for the phase (602), how long the phase lasted (603), a name of a person who initiated a transition to a subsequent phase (604), the phone number or extension of the person who initiated the transition to the subsequent phase (605), a description of what happened during the phase (606), a name of a person (e.g., an agent) or telephonic entity (e.g., a queue) that received the call after the transition to another phase (607), and a phone number or extension of the person or telephonic entity that received the call after the transition to another phase (608). Detail table 600 may show the entire duration of the phone call (609), the total time caller 102 waited (610), whether the call was to the contact center ("inbound") or from the contact center ("outbound") (611), whether anything took place during the call that was outside of the service-level agreement ("Out of SLA") between the contact center and caller 102 or another entity (e.g., caller 102 having to wait longer than a predefined period of time), and whether the call was answered (614).

Figure 7:
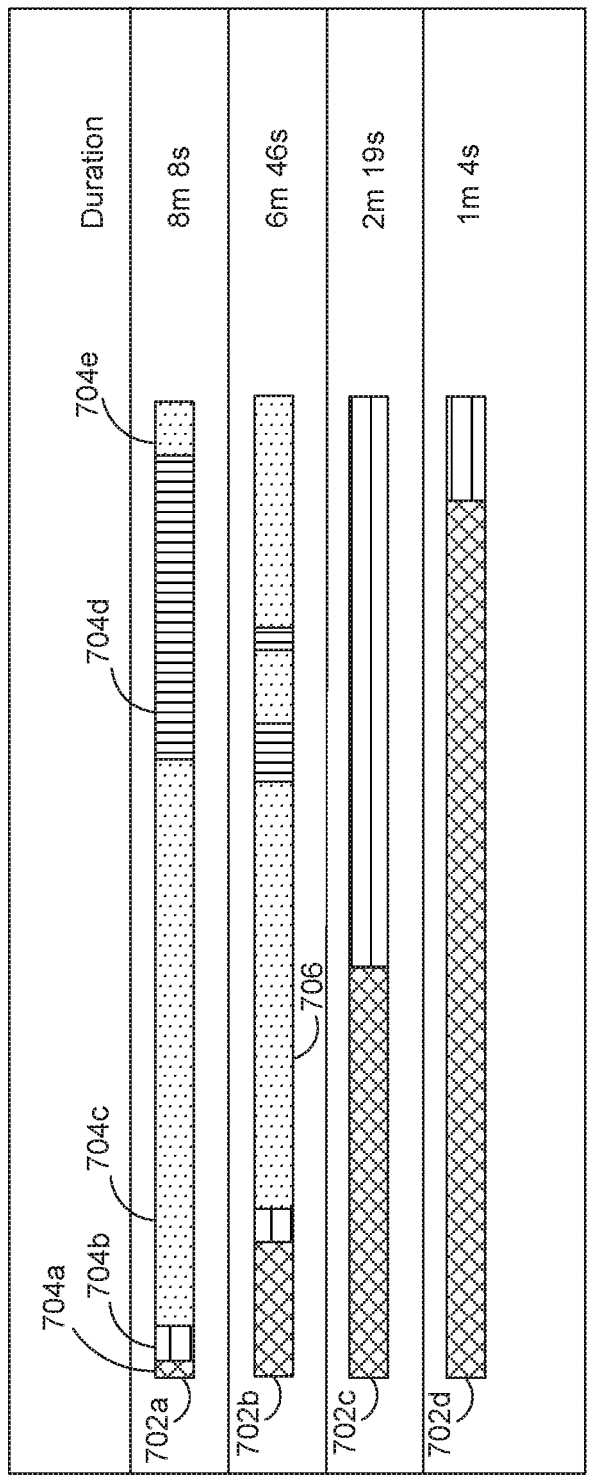
FIG. 7 illustrates example diagrams that may be generated by an application.
Figure 8:
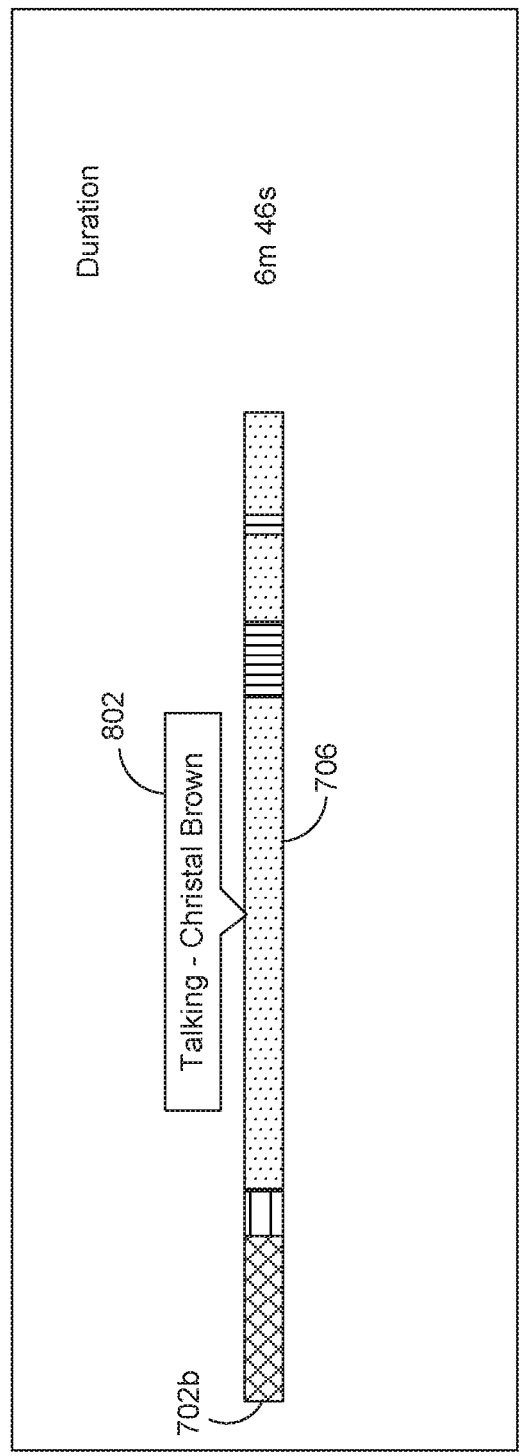
FIG. 8 illustrates an example pop-up box.

Web application 132 may generate a diagram or a collection of diagrams such as example diagrams 702a-d in FIG. 7. Diagram 702a, for example, graphically indicates a plurality of call-portion durations 704a-e with horizontal bars having different shadings. Each call-portion duration may be associated with a phase of a call (e.g., how long the call was ringing (704a), how long caller 102 was in a queue (704b), how long caller 102 was having a live conversation with agent 122a (704c), how long caller 102 was placed on hold for (704d), how long caller 102 was using contact center's 104 voicemail (704e)). In addition or instead of the duration of call portions, diagram 702a may graphically indicate the sequence of the call portions. Colors may be used in addition to or instead of using shading to represent various call portions (e.g., a red bar may indicate ringing, purple may indicate waiting in a queue, green may indicate live talk, etc.). User of web application 132 may select a call portion using, for example, a cursor, and be presented with additional information about the call portion selected. For example, if call-portion duration 706 of diagram 702b indicates a live conversation between caller 102 and an agent, selecting call-portion duration 706 may bring up information about the caller who made the diagramed call or the agent who received the call (e.g., the name of the caller or the agent). This information may be presented, for example, as a pop-up box 802 in FIG. 8.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the sequence of steps shown in figures are only for illustrative purposes and are not intended to be limited to any particular sequence of steps. As such, those skilled in the art can appreciate that these steps can be performed in a different order while implementing the same method.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A computer-implemented method for generating application data from call data, the method comprising:
   acquiring, with one or more call-data aggregators, call data from at least one call-data source;
   modifying at least a portion of the call data with a call-data modifier;
   generating application data from the portion of the call data, wherein the application data is configured for diagram generation; and
   generating a first diagram from the application data, wherein the first diagram indicates a plurality of call-portion durations, each call-portion duration of the plurality of call-portion durations having associated with presentation configured to be presented upon selection, and wherein the first diagram reflects two or more of the plurality of call-portion durations in a temporal sequence and each call-portion duration reflected in the first diagram is associated with a phase of a call.

2. The method of claim 1, further comprising generating a second diagram from the application data, wherein the second diagram graphically indicates volumes of calls in branches of an interactive voice response (IVR) system map.

3. The method of claim 2, wherein the second diagram is a flow diagram comprising a connector associated with a branch of the IVR system map and wherein the connector has a width proportional to a volume of calls in the branch of the IVR system map.

4. The method of claim 3, wherein the connector has a color associated with a branch of the IVR system map.

5. The method of claim 3, wherein the connector has a color associated with an endpoint of a branch of the IVR system map.

6. The method of claim 1, wherein at least one call-portion duration has a color associated with a phase of a call.

7. The method of claim 1, wherein the plurality of call-portion durations comprise a duration of a caller being in a queue of a call, a duration of the caller being in a live conversation of the call, a duration of ringing of the call, a duration of the caller being on hold, a duration of the caller being transferred, or a duration of the caller using voicemail.

8. The method of claim 1, wherein the first diagram further reflects a starting time of each of the plurality of the call-portion durations.

9. A system for generating application data from call data, the system comprising:
   one or more call-data aggregators;
   one or more call-data modifiers;
   at least one memory device storing computer-executable instructions; and
   at least one processor configured to execute the stored instructions to:
      acquire, with a call-data aggregator, call data from at least one call-data source;
      modify at least a portion of the call data with a call-data modifier;
      generate, with the call-data modifier, application data from the portion of the call data, wherein the application data is configured for diagram generation; and
      generate, with the call-data modifier, a first diagram from the application data, wherein the first diagram indicates a plurality of call-portion durations, each call-portion duration of the plurality of call-portion durations having associated with presentation configured to be presented upon selection, and wherein the first diagram reflects two or more of the plurality of call-portion durations in a temporal sequence and each call-portion duration reflected in the first diagram is associated with a phase of a call.

10. The system of claim 9, wherein the at least one processor is further configured to execute the stored instructions to generate, with the call-data modifier, a second diagram from the application data, wherein the second diagram graphically indicates volumes of calls in branches of an interactive voice response (IVR) system map.

11. The system of claim 10, wherein the second diagram is a flow diagram comprising a connector associated with a branch of the IVR system map and wherein the connector has a width proportional to a volume of calls in the branch of the IVR system map.

12. The system of claim 11, wherein the connector has a color associated with a branch of the IVR system map.

13. The system of claim 11, wherein the connector has a color associated with an endpoint of a branch of the IVR system map.

14. The system of claim 9, wherein at least one call-portion duration has a color associated with a phase of a call.

15. A non-transitory computer-readable medium storing instructions executable by at least one processor to facilitate generating application data from call data according to a method, the method comprising:
   acquiring, with one or more call-data aggregators, call data from at least one call-data source;
   modifying at least a portion of the call data with a call-data modifier;
   generating application data from the portion of the call data, wherein the application data is configured for diagram generation; and
   generating a first diagram from the application data, wherein the first diagram indicates a plurality of call-portion durations, each call-portion duration of the plurality of call-portion durations having associated with presentation configured to be presented upon selection, and wherein the first diagram reflects two or more of the plurality of call-portion durations in a temporal sequence and each call-portion duration reflected in the first diagram is associated with a phase of a call.

16. The non-transitory computer-readable medium of claim 15, the method further comprising generating a second diagram from the application data, wherein the second diagram graphically indicates volumes of calls in branches of an interactive voice response (IVR) system map.

17. The non-transitory computer-readable medium of claim 16, wherein the second diagram is a flow diagram comprising a connector associated with a branch of the IVR system map and wherein the connector has a width proportional to a volume of calls in the branch of the IVR system map.

18. The non-transitory computer-readable medium of claim 17, wherein the connector has a color associated with a branch of the IVR system map.

19. The non-transitory computer-readable medium of claim 17, wherein the connector has a color associated with an endpoint of a branch of the IVR system map.

20. The non-transitory computer-readable medium of claim 15, wherein at least one call-portion duration has a color associated with a phase of a call.

* * * * *